Patented Jan. 16, 1940

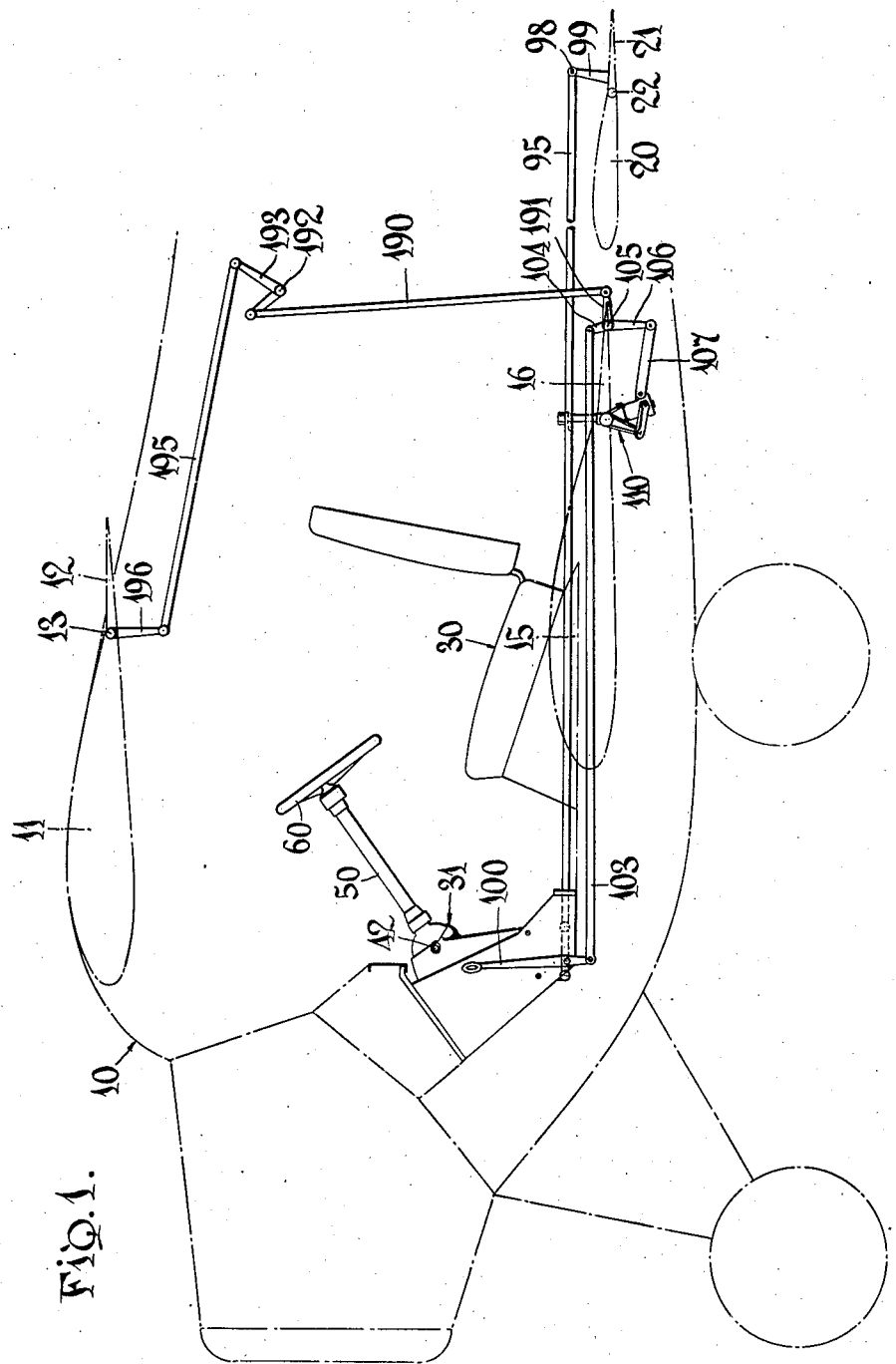

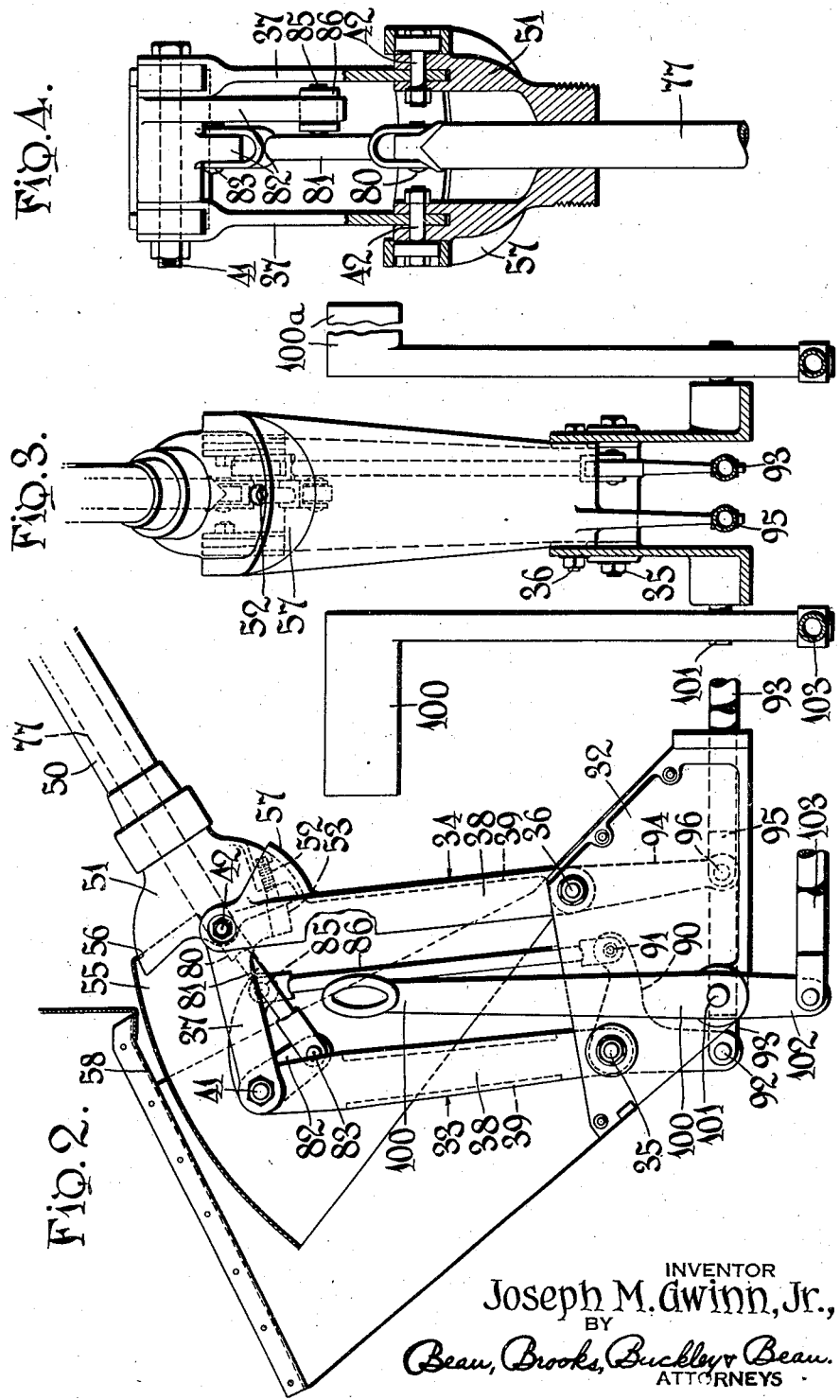

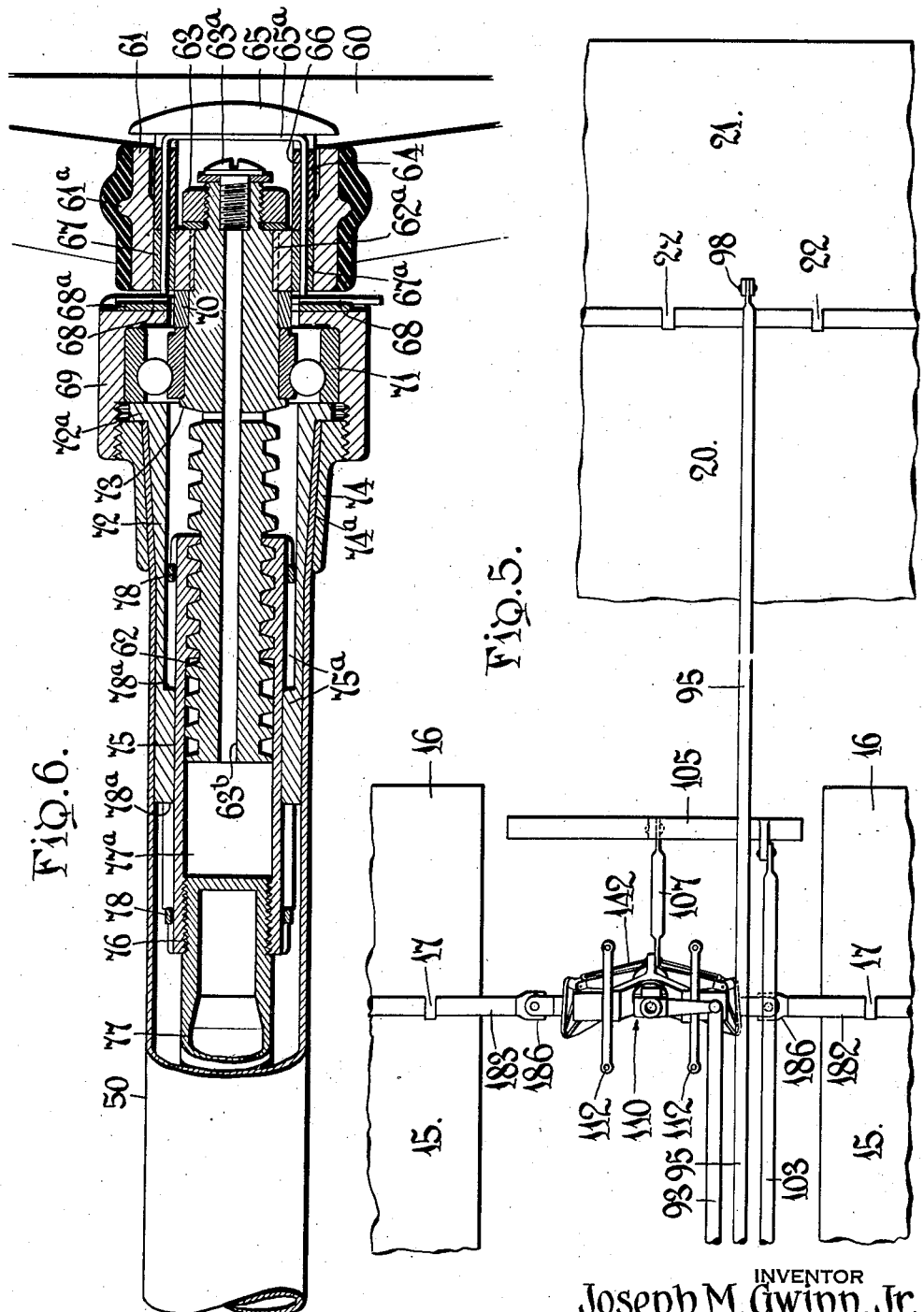

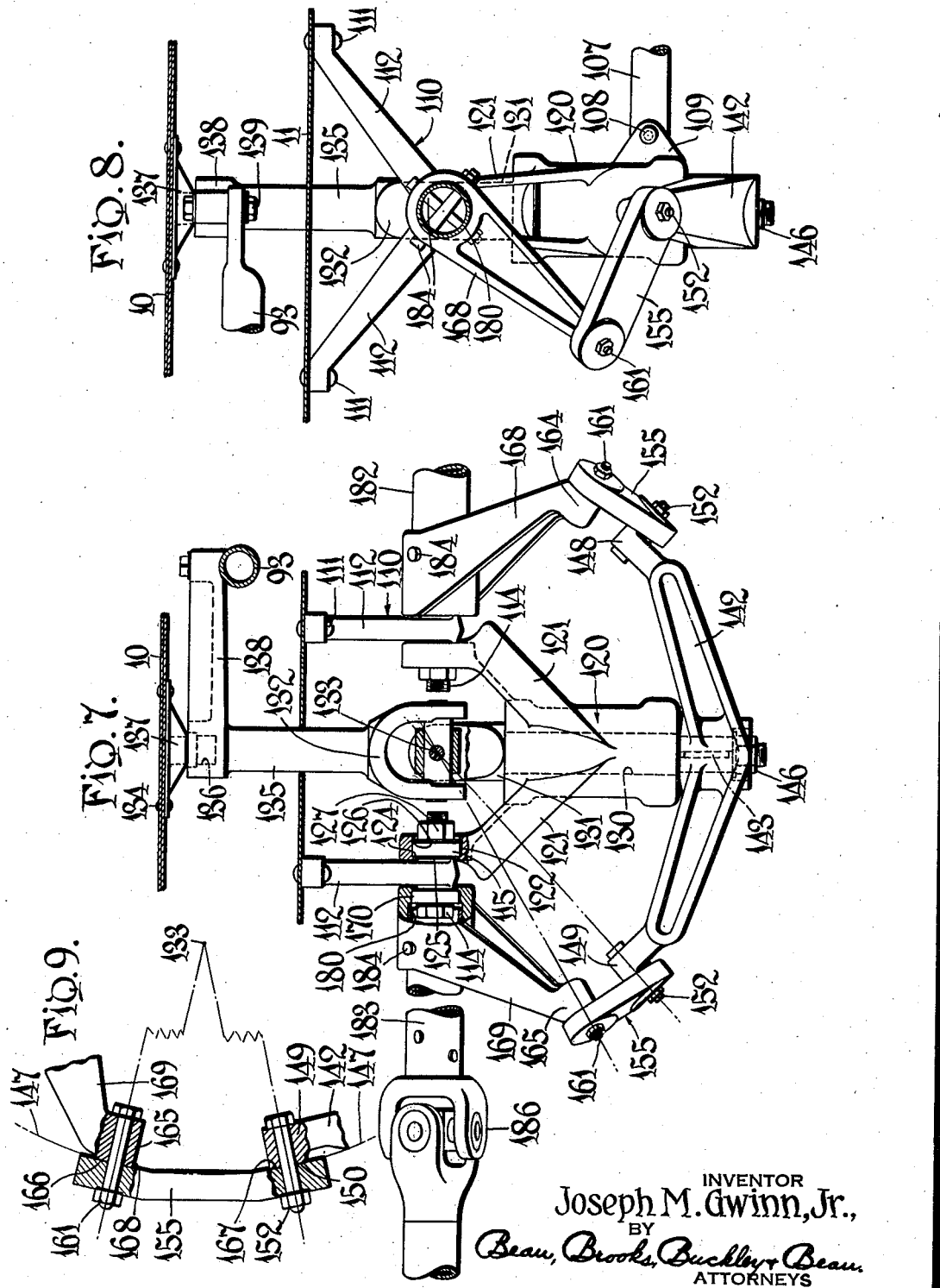

2,187,152

UNITED STATES PATENT OFFICE 2,187,152

AIRCRAFT CONTROL

Joseph M. Gwinn, Jr., Buffalo, N. Y.

Application February 27, 1937, Serial No. 128,255

11 Claims. (Cl. 244—83)

This invention relates to control mechanisms for aircraft and more particularly to mechanisms for operating movable surfaces for flight control purposes.

One object of the invention is the provision of an improved mechanism for selectively transmitting control movements to aircraft control surfaces.

Another object of the invention is to provide an improved mechanism for superposing similar and opposite control motions upon control members for producing coincidental plural control effects.

Another object of the invention is to provide a plural control mechanism having manually operable structure conveniently disposed at a position remote from its supporting structure and yet so arranged that the assemblage is supported at all positions of operation in such manner that the mechanism inherently tends to remain in any position of its adjustment.

The operation of an aircraft is generally accomplished through use of a number of controls which are connected to movable surfaces thereon, and which of necessity comprise independently acting parts. These operating parts are usually separately disposed upon the aircraft in different locations, and a multiplicity of parts and supporting elements therefor are required. Such an arrangement complicates the process of manufacturing the aircraft and causes reaction forces of the controls to be imposed upon the supporting structure at separated points. These factors introduce problems in design and construction which must be solved in order to insure rigidity of the control mechanism and to prevent vibration in the supporting structure, whereby a smoothly operating and inherently stable control system may be obtained. It is therefore desirable to provide an efficient compact structure comprising the essential elements of a plural control mechanism which may be manufactured and assembled in an aircraft as a unit.

It is sometimes desirable to move the same control surface in connection with a plurality of flight controlling operations. For example, wing flaps mounted upon opposite sides of the aircraft may be moved in reverse directions for lateral control purposes, and the same flaps may be actuated concurrently in the same direction for air braking or increased lift effect.

The invention is exemplified in a structure in which movable control surfaces of an aircraft can be actuated concurrently in the same direction for adjustment; and from any position of such adjustment, these surfaces can be moved in opposite directions of adjustment, in order that the two kinds of adjustments specified can be superposed upon one another throughout the entire range of operating control of the aircraft. A unitary control mechanism conveniently accessible to the pilot is provided with a plurality of control elements connected to the control surfaces, and this mechanism is composed of a plurality of links, or the like, which include a pivotable frame structure formed with polygonal sides.

In the drawings:

Fig. 1 is a fragmentary diagrammatic elevation of the control mechanism as applied upon an aircraft;

Fig. 2 is a fragmentary view, partly in elevation and partly in section, on an enlarged scale, of the pilot controls;

Fig. 3 is a fragmentary rear elevation of the structure shown in Fig. 2;

Fig. 4 is a fragmentary plan of a pivotal frame supporting portions of the control mechanism;

Fig. 5 is a fragmentary diagrammatic plan of the control mechanism applied upon an aircraft;

Fig. 6 is a fragmentary longitudinal section on an enlarged scale of a steering post;

Fig. 7 is a fragmentary front elevation, on a larger scale, showing in detail a portion of the control mechanism;

Fig. 8 is a side elevation of the structure shown in Fig. 7;

Fig. 9 is a fragmentary longitudinal section through one of the links of the control mechanism.

Referring to the drawings, the aircraft comprises generally a fuselage 10, fixed upper wings 11 extending laterally from each side of the fuselage, movable flaps 12 hingedly mounted, as indicated at 13, upon the trailing edges of said wings, fixed lower wings 15, flaps 16 hingedly mounted, as indicated at 17, upon the wings 15 at their trailing edges, a horizontal stabilizer 20 and an elevator 21 hinged thereto, as indicated at 22, a pilot's seat 30, a pilot control assemblage 31, and a control motion transmitting unit 110.

The pilot control mechanism 31 is positioned within the fuselage 10 and in front of the pilot's seat 30, and is particularly arranged with a view to the pilot's comfort and ease of entrance and exit to and from the pilot's seat. As shown in Figs. 2 and 3, the mechanism 31 includes a base 32 adapted for rigid mounting upon the fuselage 10, and front and rear posts 33 and 34, respectively, each of which are pivotally mounted at their lower ends upon the base 32 by bolts 35 and 36, respectively. A pair of links 37 are pivotally connected to corresponding sides of the upper ends of the posts 33 and 34 by means of a pin 41 and a pair of bearings 42, respectively.

The posts 33 and 34 (Figs. 2–4) are generally of channel-like shape, comprising opposite parallel side members 38 and intermediate transverse web members 39. The opposite ends of the side members 38 extend beyond the web portions 39 and receive bolts 41—42, and bolts 35—36. The posts 33 and 34 and the links 37 are so proportioned and connected that there is thus provided a parallelogram-like frame which is pivotable forwardly and rearwardly with respect to the longitudinal axis of the fuselage upon its connections to the stationary base 32.

A control column 50 carrying a control wheel 60 and formed at its lower end with a bell-like portion 51 is pivotally mounted at the sides of the latter upon the bolts 42. The outer surface of the bell portion 51 is preferably a surface of revolution about the axis of the pivot bolt 42. A set screw 52 mounted in screw threaded relation in the lower part of the bell 51 provides adjustable means for cooperating with an arm 53 which extends rigidly from the link 37 to provide adjustable stop means for limiting the downwardly pivotal movement of the column 50 about the bolts 42. Thus, from any adjusted position the column 50 may be freely swung about the bolts 42 upwardly and away from the pilot's seat for the convenience of the pilot when entering or leaving the seat. The screw 52 may be adjusted to determine the position of the column 50 at any desired angle to conveniently suit persons of different physical proportions.

The pivotal connection at 42 of the control member 50 to the supporting link structure also operates to lessen the possibility of injury to the pilot in the event of a crash or other cause of rapid deceleration of forward movement of the aircraft. Under such circumstances the control members 50 and 60 move upwardly and forwardly about the pivotal connections 42 under the pressure of the pilot's hands and/or the momentum of the structure, whereby it is moved out of range of those portions of the pilot's body that are pitched forwardly relatively of the fuselage as a result of the impact. Or, if the pilot has a sufficient opportunity, he may prepare for an imminent crash by deliberately moving the control members to its forward and upward position, thus avoiding violent contact of his body against the control member at the time of impact.

A casing 55 is fixedly mounted upon the rear post 34 enclosing the rear and a portion of each side of the pivotal post mechanism, and is formed with a circular opening 56, which together with a projecting lip 57 formed on the post 34 receives the bell-end 51 of the column 50. Since the surface of the bell portion 51 is a surface of revolution, the clearance between the portion 51 and the marginal edges of the opening 56 and the lip 57 remains constant during adjusting movements of control column 50 about axis 42. This casing provides a covering for the mechanism without interfering with the vertical swinging movement of the column 50 about the bolts 42. The web member 39 of the post 34 terminates at a point below the opening 56. An outer stationary casing member 58, fixedly mounted upon the base 32 receives the forward edges of the casing 55 in telescopic relation and extends forwardly along the sides and thence across the front of the mechanism, thus completing enclosure of the latter without interfering with pivotal movements thereof upon the bolts 35 and 36. The outer surface of the casing 55 is preferably a surface of revolution about the axis of the pin 36, hence, the clearance between the casing 55 and the marginal edge portions of the casing 58 remains constant throughout movements of the post 34 relative to the base 32.

The control column 50 (Figs. 2 and 6) is of tubular construction and is provided at its upper end with a pilot's control wheel 60 which has a hub 61 rigidly secured to the central portion thereof, as indicated at 61a, and a threaded bolt 62 has a splined or keyed connection 62a securing it in the central portion of the hub. The outer end of the bolt 62 is provided with a nut 63 and a screw 63a for rigidly securing the hub 61 thereon, and the nut and screw are disposed in a recessed portion 64 of the hub. The screw 63a also serves as a plug to close an axial opening 63b extending longitudinally through the bolt 62.

The outer portion of the hub 61 has a horn button 65 mounted axially of the recess 64 by means of a U-shaped member 65a carried in an annular resilient member 66 composed of sponge rubber or other suitable material extending beyond the extremity of the hub 61 and through which the U-shaped member extends. The end portions of the U-shaped member extend slidably through insulating material 67 disposed in openings 67a formed in the wall of the hub 61. These end portions of the U-shaped member 65a are movable into contact with a pair of spaced electrical contact members 68 which communicate with a suitable electric horn (not shown) and in a conventional manner. The contact members 68 are connected to an insulating ring 68a mounted in the end portion of a coupling member 69 which is mounted upon the end portion of the column 50, and is spaced slightly from the hub 61. A collar 70 disposed about the upper end of the bolt 62 serves to space the hub 61 from a bearing 71 mounted in the coupling 69. The opposite sides of the bearing 71 are prevented from moving axially by resting against the collar 70 on one side and a shoulder 72a on the other side, the latter shoulder constituting an end portion of a sleeve 72 carried rigidly in the column 50. A shoulder 73 formed on the bolt 62 at the inner side of the bearing 71 cooperates with the nut 63 and walls of the coupling 69 to prevent longitudinal movement of the bolt 62 relative to the column 50, but permits free rotation of the wheel 60 and the bolt 62 relative to the column. The inner end of the coupling member 69 is screw-threaded upon the end of a collar 74 which is wedged upon a flared portion 74a of the column 50 and abuts the shoulder 72a.

The inner wall of the sleeve 72 interfits in longitudinal sliding relation with the outer wall of a tube 75 by means of spline connections 75a. The tube 75 is internally threaded and is engaged with the threaded portion of the bolt 62 and is rigidly connected, as indicated at 76, to the upper closed end of a push-pull tube 77. Thus, rotation of the bolt 62 causes longitudinal movement of the tube 77. In order to limit longitudinal movement of the tube 75 and 77 which constitute a unit, stops 78 are mounted on the tube 75 and are adapted to limit movement of the tube 75 by cooperating with stop shoulders 76a formed on the sleeve 72. These stops are sufficiently spaced to permit the desired amount of longitudinal movement of the tube 77 in the column 50.

From this description it will be observed that a chamber 77a within the bore of tube 75 is provided between the opposed ends of tube 77 and bolt 62 into which lubricant can be introduced through the axial opening 63b upon removal of the screw 63a. Longitudinal movement of the bolt 62 in the tube 75 causes the lubricant to be forced through the interfitting screw threaded portions of the tube 75 and the bolt 62 and thence to the spline connections 75a.

The lower end of the tube 77 is connected to one side of a conventional knuckle joint 80 (Fig. 4), having its pivot axis normally in substantial axial alignment with the bolts 42. A rod 81 pivotally connects the opposite side of the knuckle joint 80 to one end of a bell-crank 82 as by means of a pin 83. The bell-crank 82 is fulcrumed upon the bolt 41 between the side members 38 of the post 33 and is pivotally connected at its opposite end by means of a pin 85 to one end of a rod 86, which in turn, is pivotally connected at its lower end to a bell-crank 90 by means of a pin 91. The web 39 of the post 33 terminates at a point below the sweep of the bell-crank 82. The parts are so arranged that a line joining the pivot points 41 and 85 is equal in length and parallel to a line joining the pivot points 35 and 91. The members 86 and 33 are thus arranged in parallel spaced relation, and the members 33 and 34 can be pivoted forwardly or rearwardly upon their lower supports 35 and 36 without causing motion of the bell crank 90 relative to the base 32.

The bell-crank 90 is fulcrumed upon the bolt 35, and has its lower end pivotally connected by a pin 92 to one end of a conventional push-pull control tube 93 which extends rearwardly of the fuselage 10 through suitable guides or supports (not shown) to the control motion transmitting unit 110. Thus, as viewed in Fig. 2, rotation of the wheel 60 to the right with respect to the view of the pilot will move the rods 77 and 81 forwardly and rotate the bell-crank 82 clockwise. The rod 86 will thus be moved downwardly and the bell-crank rotated clockwise, and the tube 93 will be moved forwardly of the aircraft fuselage. Rotation of the wheel to the left will impart reverse movements to the various members of the mechanism and to the tube. 93.

The lower end of the post 34 is provided with an arm 94 extending below its point of connection with the bolt 36. The arm 94 is pivotally connected by means of a pin 96 to one end of a push-pull control tube 95 which extends rearwardly of the fuselage 10 (Figs. 1, 2 and 5) and is pivotally connected by means of a pin 98 at its opposite end to a horn 99 extending rigidly from the elevator 21. Thus, forwardly or rearwardly bodily rocking movements of the column 50 and its supporting mechanism about the pivotal base bolts 35 and 36 will produce longitudinal movements of the rod 95, and upward or downward pivotal movements of the elevator 21 about its hinge connections 22 to the stabilizer 20.

It will be apparent that the axial alignment of the knuckle joint 80 and the bolts 42 permits vertical pivotal movements of the control column 50 without disturbing the relationship of the rod 85 to the post 33. Thus, any such movements will not affect the relation between the position of the various connected control surfaces and the control wheel 60.

It will also be apparent that forward or rearward motion of the control mechanism upon the bolts 35 and 36 to cause actuation of the elevator 21 will be accompanied by a pivotal movement of the post 33; but inasmuch as the bell-cranks 82 and 90 are freely pivotal upon the bolts 41 and 35 and the member 86 is at all times parallel to the post 33 the relationship of the bell-crank 90 and the base member 32 remains unchanged. Also, rotation of wheel 60 will result in a corresponding rotation of bell-crank 90 and a longitudinal movement of rod 93 to operate flaps 16 without shifting the relation of the members that control the elevator motion. The base member 32, the posts 33 and 34, and the links 37 provide a frame having parallelogram sides and being pivotable forwardly and rearwardly above the base 32 for supporting the control column 50. Throughout such pivotal movements of the frame, the links 37 remain parallel to an imaginary plane intersecting the axes of the bearings 35 and 36, and thus the angular relation between the column 50 and the fuselage 10 likewise remains constant for any condition of adjustment of the set screw 52. The substantial vertical extent of the frame and the column 50 above the base 32 provides a control mechanism which moves at its upper end, and at its point of center of gravity, from a central position of control neutral to an adjacent position of adjustment through a substantially horizontal path. Therefore no appreciable gravity pull is imposed upon the mechanism that would otherwise upset its equilibrium or disturb the adjustments of the connected control surfaces or require the pilot to exert an offsetting force upon the controls.

The provision of a supporting structure for the control members which is at all times in a position remote from the pilot and passenger seat reduces the possibility of accidental interference with the controls of the aircraft, by the occupants.

An upwardly extending pedal 100 is pivotally mounted upon the base 32 by a bearing 101, and is formed with a downwardly extending arm 102 which is pivotally connected at its outer end to one end of a push-pull tube 103. The tube 103 extends rearwardly through the fuselage 10 and is pivotally connected at the opposite end to the end of a horn 104 extending rigidly from a shaft 105 which is journalled upon the fuselage 10. The end of an oppositely extending arm or horn 106 which is formed rigidly upon the shaft 105 is pivotally connected to one end of a rod 107, and the opposite end is pivotally connected by means of a pin 108 to an ear 109 formed on the motion transmitting unit 110 for transmitting control movements from the pedal 100 to the wing flaps 16. A pedal 100a is pivotally mounted upon the base 32 for operation of ground wheel brakes (not shown) through suitable connecting means.

There is thus provided a unitary pilot control mechanism through which several separate control movements may be transmitted without interference one with the other, and which may be manufactured as a unit and conveniently installed in an aircraft by attachment to a minimum amount of supporting structure. The control mechanism resembles generally the conventional control mechanism provided for automobiles, with which the average person is quite familiar. This resemblance is not only in appearances, but pertains functionally as well, in that the wheel 60 is rotatable for steering purposes and the pedals are operable for controlling speed. The assemblage of the several control members upon a single base member confines the reaction forces which develop upon actuation of the controls to this single rigid member.

Referring to Figs. 7, 8 and 9, the control motion transmitting unit 110 comprises a pair of V-shaped brackets 112 which are rigidly mounted by means of bolts 111 upon a member 11 of the air craft fuselage 10. These brackets 112 carry at their lower ends transversely extending axially aligned stud shafts 114. Bearings 115 are fitted upon the inwardly extending ends of the shafts 114 for pivotally mounting upper ends of oppositely extending arms 121 of a mounting hanger 120 in freely pivotal suspended relation to the brackets 112.

The arms 121 are socketed at 122 to fit over the bearings 115. Inwardly extending shoulders 124 at the outer ends of the openings 122, and shoulders 125 extending laterally from the brackets 112, cooperate with snap rings 126 and nuts 127, which are screw threaded upon the shafts 114, to secure the arms 121 against lateral displacement without interfering with the pivotal relation of the hanger 120 upon the shafts 114.

The hanger 120 has a normally vertical and central bore 130 that receives a post 131 in freely journalling relation therein. The upper end of the post 131 is provided with a conventional universal joint 132 which is also connected to the lower end of an upper substantially vertical rod 135. In this structure the axes of the universal joint intersect at a point 133 that is on the common axis of the spaced bearings 115.

The upper end of the rod 135 is rotatable upon a stud 137 which is disposed in a bearing 136 formed in the rod end, and the stud 137 is rigidly mounted, as indicated at 134, upon the fuselage 10. The rod 135 is thus supported on the fuselage 10 for free pivotal or rotative movement about its vertical axis. A crank arm 138 extends laterally from the rod 135, and has a connection 139 at its outer end pivotally securing it to the aileron control rod 93.

The post 131 is fitted at its lower end with a cross bar or yoke 142 which is held rigidly thereon by means of a key 143 and a nut 146. Oppositely extending end portions of the yoke 142 terminate in right and left ears 148 and 149, respectively, which have outer faces 150.

Pins 152 extend at right angles through the ears 148 and 149, and the pins are so arranged that the longitudinal axes of the pins 152 intersect at the point 133 of intersection of the axes of the universal joint 132 and the axes of the bearings 115. The faces 150 of the ears 148 and 149 are equi-distant from this point of intersection, and are, therefore, tangent to an imaginary sphere indicated at 147, generated about the point 133 as a center.

Links 155 are pivotally connected at their inner ends to the ears 148 and 149, respectively, by means of the pins 152. The outer ends of the links 155 are pivotally connected by means of pins 161 to ears 164 and 165 formed on the outer ends of crank arms 168 and 169, respectively. The crank arms 168 and 169 are journalled upon bearings 170 which are fitted upon the outer extending ends of the stud shafts 114, and are thus supported thereon in a manner similar to that in which the hanger 120 is supported upon the bearings 115. The crank arms 168 and 169 are so arranged that outer faces 166 of the ears 164 and 165 lie tangent to the aforesaid imaginary sphere 147 and the longitudinal axes of the pins 161 intersect at the central point 133 of central intersection.

Each link 155 is formed with faces 167 and 168 adjacent its opposite end portions for contact with the outer ear faces 150 and 166, respectively. Therefore, the end portions of the links 155 lie in planes that are tangential to the imaginary sphere 147 regardless of the relative positions of the yoke 142 and crank arms 168 and 169.

The crank arms 168 and 169 are provided with sockets 180 in which right and left wing-flap torque tubes 182 and 183, respectively, are rigidly fitted and held against displacement therefrom by pins 184.

Conventional universal joints 186 are provided in the torque tubes 182 and 183 to permit the stationary wings of the aircraft to be arranged upon the fuselage in dihedral angular relation, and to prevent the transmission of undesirable forces to the elements of the unit 110.

Rotation of the control wheel 60 will cause longitudinal movement of the tube 93, as described above, and in turn cause the rod 135 and post 131 to be rotated about their longitudinal axes. This will in turn rotate the yoke 142 and move its ears 148 and 149 in opposite directions about the axis of the post 131 as a center. Thus opposite motions will be imparted through the links 155 to cranks 168 and 169, and thence to the wing flap torque tubes 182 and 183 which will be rotated in opposite directions for adjusting the wing flaps 16 for lateral control purposes. The ratio of the extent of the upward and downward movement imparted to the oppositely disposed wing flaps may be varied by altering the angle between the extending yoke arms radially of their axis of rotation in the hanger 120.

Forward movement of the pedal 100 will operate through tube 95 to rotate the shaft 105 clockwise, (as viewed in Fig. 1). Tube 107 will then move the hanger 120 forwardly of the fuselage about the bearings 115, and through links 155 the motion of the hanger will be translated into coincidental clockwise rotation of torque tubes 182 and 183 and equal movements of the wing flaps 16 downwardly about their hinged connections to the fixed wings 15.

The adjustments of the wing flaps 16 either in opposite directions for use as ailerons or in similar directions for use as flaps may be made independently one from the other and may be superposed one upon the other throughout the entire range of their adjustability. For example, the flaps 16 may be simultaneously lowered by pedal 100 and connected members, yet at all times they are relatively movable in opposite directions for lateral control purposes by means of the wheel 60 and connected members.

Obviously, either or both of the wing flap control motions above described may be transmitted to duplicate sets of wing flaps attached to the aircraft. For example, the drawings (Fig. 1) illustrate a biplane construction wherein the motion of tube 183 is also transmitted to upper movable wing flaps 12 by means of a tube 190 which is pivotally connected at one end to a horn 191 extending from shaft 185. The opposite end of tube 190 is pivotally connected to one end of a bell-crank 193, which has a pivotal connection 192 upon the fuselage. The other end of the bell-crank 193 is pivotally connected to one end of a tube 195 which is connected at its opposite end to a horn 196 extending rigidly from the flaps 12.

Although only one form of the invention has been shown and described in detail, it will be apparent to those skilled in the art that the invention is not so limited, but that various changes can be made therein without departing from the spirit of the invention or from the scope of the appended claims.

What is claimed is:

1. In an aircraft, a supporting structure including a pair of opposed sides, a movable flight control surface connected to each of said opposite sides of said structure, a series of pivotally connected links constituting a coupling between said surfaces, one of said links providing compound pivotal action to impart to the surfaces equal concurrent pivotal movements in the same direction or pivotal movements in opposite directions, and plural control means connected to said one link to operate the latter selectively in its compound pivotal movements.

2. In an aircraft, a supporting structure, two movable flight control surfaces connected to opposite sides of the structure, a lever, means for pivotally supporting said lever about a predetermined axis, means for rotatably carrying the lever in the first mentioned means for rotation about an axis intersecting the pivotal axis, means pivoted to the lever for connecting the lever to the control surfaces, means pivoted to the lever for actuating the lever about its pivotal axis to move the control surfaces in the same direction, and means for actuating the lever about its rotative axis to move the control surfaces in opposite directions in any position of the lever assumed about its pivotal axis.

3. In an aircraft provided with supporting structure, movable elements connected to the structure for controlling of the aircraft, an upright control member supported upon said structure by means of a pivotal connection and connected to one of said elements for actuating the latter, a lever pivoted directly upon said upright member, a link pivoted to said lever and extending parallel to said upright member, a second lever pivotally mounted upon said pivotal connection and maintaining said link in parallel relation to said upright member, means for connecting the second lever to another of said elements, and means for actuating said upright member and the first mentioned lever for independent control of said elements through said upright member and link.

4. In an aircraft provided with supporting structure, a pair of movable control surfaces carried pivotally upon said structure, a motion translating device, means for pivotally supporting said device about an axis on said structure, actuating members pivoted coaxially with the pivotal axis of said device and having connections with said control surfaces, said device having a link portion remote from its pivotal axis and pivotably connected at its opposite ends to said actuating members, means for rotatably guiding said device about an axis transversely of the axis of its pivotal support, and control means connected to said device for rotating and pivoting the latter.

5. In an aircraft provided with supporting structure, a pair of movable control surfaces carried pivotally upon said structure, a motion translating device, means for pivotally supporting said device about an axis on said structure, actuating members pivoted coaxially with the pivotal axis of said device and having connections with said control surfaces, said device having a transverse portion remote from its pivotal axis pivotally connected at its opposed ends to said actuating members, means for rotatably guiding said device about an axis transversely of the axis of its pivotal support, and a plurality of control means connected to said device for selectively imparting rotative or pivotal movement thereto or imparting compound rotative and pivotal movement thereto.

6. In a control mechanism for aircraft having movable elements for aircraft control purposes, a hanger provided with a bearing opening, means for suspending the hanger about a pivotal axis, a member rotatably mounted in said bearing opening and having its axis of rotation disposed transversely of the pivotal axis of said hanger, said member having a plurality of lateral extensions, arms having pivotal supports coaxial with the pivotal axis of said hanger, means for connecting said arms to said aircraft control elements, means for connecting said arms to said extensions, means for rotating said member in said bearing opening to actuate said extensions angularly, and means for pivoting said hanger and member as a unit about the pivotal axis of said hanger regardless of the position of said member in its bearing opening.

7. In an aircraft provided with supporting structure, movable elements connected to the structure for controlling flight of the aircraft, a pair of upright frame members pivotally supported upon said structure at their lower ends, a transverse bar extending between and pivotally connected to the upper end portions of said frame members by means of pivot pins, a lever pivotally mounted upon one of said pivot pins, a pilot actuated member operably connected to one end of said lever for imparting control motions thereto, a link pivotally connected to the other end of said lever and extending parallel to one of said upright members, means for articulating said link to one of said movable elements and maintaining the link constantly parallel to the latter upright member, pilot operable means for actuating said upright frame members about their pivotal connections to said supporting structure, and means connecting one of said upright frame members to another of said control elements.

8. In an aircraft having an operator's seat and provided with movable elements for aircraft control purposes, a plural control device having a support on said craft located at a remote location relative to said seat, and control motion transmitting devices separately connecting said control device and said movable elements for control purposes, said control device extending from its support toward said seat and independently rotatable about two axes for aircraft control purposes and pivotable relative to said support about an axis parallel to one of said axes of rotation relative to said seat without actuating any of said control motion transmitting devices.

9. In an aircraft having an operator's seat and provided with movable elements for aircraft control purposes, a control device having a support on said aircraft at a remote location forwardly of said seat, control motion transmitting devices separately connecting said control device and said movable elements for control purposes, said control device being supported laterally from its support toward said seat and independently rotatable about two axes for aircraft control purposes and pivotable relative to said support about an axis parallel to one of said axes of rotation relative to said seat without actuating any of said control motion transmitting devices, and adjustable stop means for limiting movement of said control device toward said seat to various adjusted positions.

10. In a control mechanism for aircraft having a plurality of movable surfaces for flight control purposes, a motion transmitting device, means for pivotally supporting said device about an axis of said structure, actuating members having connections with said control surfaces and mounted for rotation about axes coincident with said pivotal axis, said device having a portion extending transversely from said pivotal axis, a plurality of arms extending radially about said transverse portion of said device and pivotally connected by means of linkage at their outer ends to different of said actuating members, the angular relation of said arms being such as to procure differential control surface movements in opposite directions of movement in response to rotative movements of said transverse portion of said device about an axis intersecting said pivotal axis and movements of said control surfaces coincidentally similar in direction and magnitude in response to pivotal movements of said device about said pivotal axis, and a plurality of control means connected to said device for selectively imparting rotative or pivotal movement thereto or imparting compound rotative and pivotal movement thereto.

11. In an aircraft control mechanism, a base, a lever pivotally supported upon said base and extending therefrom and movable to actuate a control element of said aircraft, a pilot operable control member pivotably mounted upon an extending portion of said lever for transmitting control movements through said lever to said aircraft control element, a casing member mounted upon said pilot control member concentrically of the line of said pivotal mounting, a housing fixedly mounted upon said lever concentrically of the line of said pivotal support and having an opening adapted to receive said casing in free fitting relation therein, and a guard fixedly mounted relative to said base and having an opening to receive said housing in free fitting relation therein, whereby said guard and said housing and said casing combine to provide a substantially complete enclosure for the moving elements of said control mechanism.

JOSEPH M. GWINN, Jr.